US 9,586,264 B2

(12) United States Patent
Dufour et al.

(10) Patent No.: US 9,586,264 B2
(45) Date of Patent: Mar. 7, 2017

(54) DOUBLE-SIDED CUTTING INSERT FOR DRILLING TOOL

(75) Inventors: Jean-Luc Dufour, Franklin, TN (US);
X. Daniel Fang, Brentwood, TN (US);
David J. Wills, Franklin, TN (US);
Thomas B. Hartman, Murfreesboro, TN (US)

(73) Assignee: KENNAMETAL INC., Latrobe, PA (US)

( * ) Notice: Subject to any disclaimer, the term of this patent is extended or adjusted under 35 U.S.C. 154(b) by 1353 days.

(21) Appl. No.: 12/431,384

(22) Filed: Apr. 28, 2009

(65) Prior Publication Data

US 2010/0272526 A1     Oct. 28, 2010

(51) Int. Cl.
    B23B 27/14      (2006.01)
    B23B 51/04      (2006.01)

(52) U.S. Cl.
    CPC .......... B23B 27/141 (2013.01); B23B 51/048 (2013.01); *B23B 2200/0423* (2013.01); *B23B 2200/286* (2013.01); *B23B 2200/3636* (2013.01); *B23B 2200/3681* (2013.01); *Y10T 407/23* (2015.01); *Y10T 407/235* (2015.01)

(58) Field of Classification Search
    CPC .... B23B 2200/3681; B23B 2200/3636; B23B 2200/0423; B23B 2200/0471; B23B 27/141; B23B 27/145; B23B 51/048
    USPC .... 407/113, 114, 2, 115, 116; 408/223, 224, 408/713
    See application file for complete search history.

(56) References Cited

U.S. PATENT DOCUMENTS

| | | |
|---|---|---|
| 1,838,520 A | 12/1931 | Archer |
| 3,399,442 A | 9/1968 | Jones et al. |
| 3,490,117 A | 1/1970 | Hertel |
| 3,557,416 A | 1/1971 | Jones |
| 3,621,549 A | 11/1971 | Billups |
| 3,636,602 A | 1/1972 | Owen |
| 3,805,349 A | 4/1974 | Nose |
| 3,806,713 A | 4/1974 | Ryberg |
| 4,274,766 A | 6/1981 | Raupp et al. |
| 4,292,365 A | 9/1981 | Kane et al. |
| 4,294,565 A | 10/1981 | Erkfritz |
| 4,294,566 A | 10/1981 | Boone |
| 4,395,186 A | 7/1983 | Whyte |
| 4,412,763 A * | 11/1983 | Shallenberger, Jr. ......... 408/224 |
| 4,461,602 A | 7/1984 | Zettl |

(Continued)

FOREIGN PATENT DOCUMENTS

| | | |
|---|---|---|
| CN | 1130884 A | 9/1996 |
| CN | 1171314 A | 1/1998 |

(Continued)

OTHER PUBLICATIONS

U.S. Appl. No. 12/369,796, filed Feb. 12, 2009.

(Continued)

*Primary Examiner* — Jennifer Swinney
(74) *Attorney, Agent, or Firm* — Ian K. Samways (57) ABSTRACT

A double-sided cutting insert for a drilling tool includes a top side, a bottom side, and at least one side surface interconnecting the top side and the bottom side and forming at least one cutting edge. The top side and the bottom side comprise a different external profile and chip groove geometry and an identical inscribed circle, and each of the top side and the bottom side comprises four indexable cutting edges.

21 Claims, 7 Drawing Sheets

(56) References Cited

U.S. PATENT DOCUMENTS

| | | |
|---|---|---|
| 4,493,596 A | 1/1985 | Grunsky et al. |
| 4,595,322 A | 6/1986 | Clement |
| 4,597,695 A | 7/1986 | Johnson |
| 4,659,264 A | 4/1987 | Friedline |
| 4,679,968 A | 7/1987 | Tsujimura et al. |
| 4,681,488 A | 7/1987 | Markusson |
| 4,699,549 A | 10/1987 | Shimomura et al. |
| 4,760,548 A | 7/1988 | Baker et al. |
| 4,898,499 A | 2/1990 | Tsujimura et al. |
| 4,919,573 A | 4/1990 | Tsujimura et al. |
| 4,940,369 A | 7/1990 | Aebi et al. |
| 5,052,863 A | 10/1991 | Satran |
| 5,071,292 A | 12/1991 | Satran |
| 5,092,718 A | 3/1992 | Shallenberger |
| 5,094,572 A | 3/1992 | Alsbury et al. |
| 5,137,398 A | 8/1992 | Omori et al. |
| 5,145,294 A | 9/1992 | Flueckiger |
| 5,145,295 A | 9/1992 | Satran |
| 5,193,946 A | 3/1993 | Arai et al. |
| 5,203,649 A | 4/1993 | Katbi et al. |
| 5,226,761 A | 7/1993 | Satran et al. |
| 5,244,318 A * | 9/1993 | Arai et al. ............... 407/42 |
| 5,246,315 A | 9/1993 | Hansson et al. |
| 5,333,972 A | 8/1994 | Bernadic et al. |
| 5,338,135 A | 8/1994 | Noguchi et al. |
| 5,340,246 A | 8/1994 | Tukala |
| 5,346,336 A | 9/1994 | Rescigno |
| 5,377,116 A | 12/1994 | Wayne et al. |
| 5,388,932 A | 2/1995 | DeRoche et al. |
| 5,395,186 A | 3/1995 | Qvart |
| 5,408,598 A | 4/1995 | Pryor, Jr. |
| 5,421,679 A | 6/1995 | Pantzar et al. |
| 5,443,335 A | 8/1995 | Shimano et al. |
| 5,454,670 A | 10/1995 | Noda et al. |
| 5,474,407 A | 12/1995 | Rodel et al. |
| 5,536,119 A | 7/1996 | Werner et al. |
| 5,542,795 A | 8/1996 | Mitchell |
| 5,586,843 A | 12/1996 | Minicozzi |
| 5,593,255 A | 1/1997 | Satran et al. |
| 5,634,745 A | 6/1997 | Wiman et al. |
| 5,658,100 A | 8/1997 | Deiss et al. |
| 5,688,081 A | 11/1997 | Paya |
| 5,695,303 A * | 12/1997 | Boianjiu et al. ............ 407/114 |
| 5,725,334 A | 3/1998 | Paya |
| 5,762,453 A | 6/1998 | Arai et al. |
| 5,772,365 A | 6/1998 | Vogel et al. |
| 5,779,401 A | 7/1998 | Stallwitz et al. |
| 5,791,831 A | 8/1998 | Shimano et al. |
| 5,791,833 A | 8/1998 | Nielbauer |
| 5,791,883 A | 8/1998 | Ban et al. |
| 5,803,674 A | 9/1998 | Satran et al. |
| 5,951,212 A | 9/1999 | Emoto et al. |
| 5,951,213 A * | 9/1999 | Fauser et al. ............... 407/35 |
| 5,957,629 A | 9/1999 | Hessman et al. |
| 5,957,635 A | 9/1999 | Nuzzi et al. |
| 5,971,676 A | 10/1999 | Kojima |
| 6,017,171 A | 1/2000 | Karlsson |
| 6,050,752 A | 4/2000 | DeRoche |
| 6,053,671 A | 4/2000 | Stedt et al. |
| 6,100,904 A | 8/2000 | Gupta |
| 6,142,716 A | 11/2000 | Jordberg et al. |
| 6,152,658 A * | 11/2000 | Satran et al. ............... 407/103 |
| 6,164,878 A | 12/2000 | Satran et al. |
| 6,186,705 B1 | 2/2001 | Kumar et al. |
| 6,234,724 B1 | 5/2001 | Satran et al. |
| 6,238,133 B1 | 5/2001 | DeRoche et al. |
| 6,244,791 B1 | 6/2001 | Wiman et al. |
| 6,257,807 B1 * | 7/2001 | Heinloth ............... 407/113 |
| 6,270,297 B1 | 8/2001 | Fang et al. |
| 6,293,737 B1 | 9/2001 | Satran et al. |
| 6,540,448 B2 | 4/2003 | Johnson |
| 6,543,970 B1 | 4/2003 | Qvarth et al. |
| 6,599,061 B1 * | 7/2003 | Nelson ............... 407/114 |
| 6,601,484 B1 | 8/2003 | Katoh et al. |
| 6,607,335 B2 | 8/2003 | Morgulis |
| 6,623,217 B2 | 9/2003 | Brockett et al. |
| 6,655,881 B2 | 12/2003 | Shimizu |
| 6,669,412 B1 | 12/2003 | Hirose et al. |
| 6,684,742 B1 | 2/2004 | White |
| 6,715,967 B2 | 4/2004 | Wiman et al. |
| 6,722,824 B2 | 4/2004 | Satran et al. |
| 6,769,844 B2 | 8/2004 | Waggle |
| 6,796,750 B2 | 9/2004 | Men |
| 6,811,359 B2 | 11/2004 | Craig |
| 6,835,028 B2 | 12/2004 | Usui et al. |
| 6,862,966 B2 | 3/2005 | Knapp |
| 6,884,006 B2 | 4/2005 | Nagashima |
| 6,921,233 B2 | 7/2005 | Duerr et al. |
| 6,929,427 B2 | 8/2005 | Satran |
| 6,929,429 B2 | 8/2005 | Riviére |
| 6,948,889 B2 | 9/2005 | Arvidsson |
| 6,957,935 B2 | 10/2005 | Sung et al. |
| 6,960,049 B2 | 11/2005 | Inayama |
| 7,021,871 B2 | 4/2006 | Arvidsson et al. |
| 7,037,051 B2 | 5/2006 | Wermeister |
| 7,070,363 B2 | 7/2006 | Long, II et al. |
| 7,104,736 B2 | 9/2006 | Satran et al. |
| 7,147,407 B2 | 12/2006 | Satran |
| 7,201,545 B2 | 4/2007 | Ejderklint |
| 7,220,083 B2 | 5/2007 | Festeau et al. |
| 7,232,279 B2 | 6/2007 | Smilovici et al. |
| 7,234,899 B2 | 6/2007 | Fang et al. |
| 7,241,082 B2 | 7/2007 | Smilovici et al. |
| 7,281,884 B2 | 10/2007 | Maeda |
| 7,306,409 B2 | 12/2007 | Stabel et al. |
| 7,325,471 B2 | 2/2008 | Massa et al. |
| 7,367,755 B2 * | 5/2008 | Wurfels et al. ............... 407/113 |
| 7,393,163 B2 | 7/2008 | Edvardsson et al. |
| 7,494,303 B2 | 2/2009 | Koskinen |
| 7,537,419 B2 | 5/2009 | Sjoberg et al. |
| 7,547,164 B2 | 6/2009 | Hessman |
| 7,604,440 B2 | 10/2009 | Fouquer |
| 7,908,945 B2 | 3/2011 | Dufour et al. |
| 8,096,735 B2 | 1/2012 | Sladek et al. |
| 8,147,171 B2 | 4/2012 | Dufour et al. |
| 8,162,572 B2 | 4/2012 | Festeau et al. |
| 8,277,151 B2 | 10/2012 | Wandeback |
| 8,444,352 B2 | 5/2013 | Festeau et al. |
| 8,454,279 B2 | 6/2013 | Dufour et al. |
| 8,491,234 B2 | 7/2013 | Fang et al. |
| 2003/0031520 A1 | 2/2003 | Hintze et al. |
| 2003/0206777 A1 | 11/2003 | Gyllengahm |
| 2003/0226694 A1 | 12/2003 | Moseley |
| 2004/0042859 A1 | 3/2004 | Edvardsson et al. |
| 2006/0115340 A1 | 6/2006 | Nishio et al. |
| 2006/0210364 A1 | 9/2006 | Bellmann et al. |
| 2006/0245837 A1 | 11/2006 | Dufour et al. |
| 2007/0041798 A1 * | 2/2007 | Nasu et al. ............... 407/114 |
| 2007/0042217 A1 * | 2/2007 | Fang et al. ............... 428/655 |
| 2007/0071561 A1 * | 3/2007 | Agic ............... 407/34 |
| 2007/0189864 A1 | 8/2007 | Festeau et al. |
| 2008/0170919 A1 | 7/2008 | Dufour et al. |
| 2008/0226943 A1 * | 9/2008 | Fang et al. ............... 428/697 |
| 2008/0273931 A1 | 11/2008 | Spitzenberger |
| 2008/0304924 A1 | 12/2008 | Engstrom |
| 2009/0097929 A1 | 4/2009 | Festeau et al. |
| 2009/0279962 A1 | 11/2009 | Dufour et al. |
| 2010/0080662 A1 | 4/2010 | Satran et al. |
| 2010/0183386 A1 * | 7/2010 | Heinloth et al. ............... 407/113 |
| 2010/0202839 A1 | 8/2010 | Fang et al. |
| 2010/0284753 A1 | 11/2010 | Festeau et al. |
| 2010/0303563 A1 | 12/2010 | Fang et al. |
| 2010/0329800 A1 | 12/2010 | Edler et al. |
| 2011/0103905 A1 | 5/2011 | Morrison et al. |
| 2012/0163929 A1 | 6/2012 | Dufour et al. |
| 2012/0251250 A1 | 10/2012 | Morrison et al. |
| 2013/0115021 A1 | 5/2013 | Festeau et al. |

FOREIGN PATENT DOCUMENTS

| | | |
|---|---|---|
| CN | 1041499 C | 1/1999 |
| CN | 1041901 C | 2/1999 |
| CN | 1045557 C | 10/1999 |
| CN | 1117646 C | 8/2003 |

(56) References Cited

FOREIGN PATENT DOCUMENTS

| | | | |
|---|---|---|---|
| CN | 1484563 A1 | 3/2004 | |
| DE | 9400327 U1 | 3/1994 | |
| DE | 4244316 A | 6/1994 | |
| DE | 4118070 C2 | 2/1995 | |
| DE | 4400538 A1 | 7/1995 | |
| DE | 102005025815 A1 | 12/2006 | |
| EP | 0091408 A2 | 10/1983 | |
| EP | 0035848 B1 | 2/1985 | |
| EP | 0285660 A1 | 10/1988 | |
| EP | 432340 A1 * | 6/1991 | B23B 51/04 |
| EP | 0551543 A1 | 7/1993 | |
| EP | 0599393 A1 | 6/1994 | |
| EP | 1013365 A | 6/2000 | |
| EP | 1157768 A1 | 11/2001 | |
| EP | 1205877 A1 | 5/2002 | |
| EP | 1297922 A1 | 4/2003 | |
| EP | 1346789 B1 | 11/2006 | |
| EP | 1749602 A2 | 2/2007 | |
| EP | 1952925 A2 | 8/2008 | |
| EP | 2119520 A1 * | 11/2009 | B23C 5/20 |
| EP | 2412462 B1 | 5/2015 | |
| FR | 2364724 A1 | 4/1978 | |
| GB | 951624 | 3/1964 | |
| GB | 2298600 A | 9/1996 | |
| IL | 169340 | 4/2010 | |
| JP | 49-32280 A | 3/1974 | |
| JP | 52-103081 A | 8/1977 | |
| JP | 59-214501 A | 12/1984 | |
| JP | 60-22218 U | 2/1985 | |
| JP | 61-201719 U | 12/1986 | |
| JP | S62-172265 A | 7/1987 | |
| JP | 62-184912 | 11/1987 | |
| JP | 4-315510 A | 11/1992 | |
| JP | 5-285708 A | 11/1993 | |
| JP | 7-33525 U | 6/1995 | |
| JP | 8-039329 | 2/1996 | |
| JP | 8-174327 A | 7/1996 | |
| JP | 8-243831 A | 9/1996 | |
| JP | H08-243827 A | 9/1996 | |
| JP | 11-129109 A | 5/1999 | |
| JP | 2001-38519 A | 2/2001 | |
| JP | 2002-301603 | 10/2002 | |
| JP | 2003-25135 A | 1/2003 | |
| JP | 2003-266232 A | 9/2003 | |
| JP | 2003-275920 | 9/2003 | |
| JP | 2004-230472 A | 8/2004 | |
| JP | 2004-291099 | 10/2004 | |
| KR | 10-0430868 | 6/2004 | |
| KR | 100783795 B1 | 12/2007 | |
| RU | 2022727 C1 | 11/1994 | |
| RU | 2138371 C1 | 9/1999 | |
| RU | 2005110805 A | 10/2006 | |
| RU | 2318634 C2 | 3/2008 | |
| SU | 344930 A | 8/1972 | |
| SU | 804239 A1 | 2/1981 | |
| SU | 814573 A1 | 3/1981 | |
| SU | 1215879 A | 3/1986 | |
| SU | 1278110 A1 | 12/1986 | |
| SU | 1504006 A1 | 8/1989 | |
| WO | WO 92/21467 A1 | 12/1992 | |
| WO | WO 94/12302 A1 | 6/1994 | |
| WO | WO 95/00272 A1 | 1/1995 | |
| WO | WO 95/32071 A1 | 11/1995 | |
| WO | WO 96/35538 A1 | 11/1996 | |
| WO | WO 00/23218 A1 | 4/2000 | |
| WO | WO 01/28722 A1 | 4/2001 | |
| WO | WO 02/18083 A2 | 3/2002 | |
| WO | WO 02/20206 A1 | 3/2002 | |
| WO | WO 02/102536 A1 | 12/2002 | |
| WO | WO 03/099495 A1 | 12/2003 | |
| WO | WO03099495 | 12/2003 | |
| WO | WO 2004/096474 A1 | 11/2004 | |
| WO | WO 2006/041353 A1 | 4/2006 | |
| WO | WO2007127109 A2 | 11/2007 | |
| WO | WO 2008/029964 A1 | 3/2008 | |
| WO | WO 2010/017859 A1 | 2/2010 | |
| WO | WO2010114201 A1 | 10/2010 | |
| WO | WO 2010/134700 A2 | 11/2010 | |

OTHER PUBLICATIONS

U.S. Appl. No. 12/967,441, filed Dec. 14, 2010.
U.S. Appl. No. 12/641,399, filed Dec. 18, 2009.
U.S. Appl. No. 12/841,206, filed Jul. 22, 2010.
Bourke, Paul, "Spline Curves (in 3D)", Nov. 1996, XP002300113. printed from http://astronomy.swin.edu.au/~pbourke/curves/spline/, 5 pages.
Shi dongping, et al., CAD/CAM for Cemented Carbide Indexable Inserts, J. Huazhong Univ. of Sci. & Tech., vol. 22, No. 2, Feb. 1994, with English abstract, 4 pages.
Shaw et al., "The Rotary Cutting Tool," Transactions of the ASME, Aug. 1952, Cambridge, Massachusetts, pp. 1065-1076.
Armarego et al., "Fundamental Studies of Driven and Self-Propelled Rotary Tool Cutting Processes—I. Theoretical Investigation," Int. J. Mach. Tools Manufact., vol. 34, No. 6, pp. 785-801.
Davis et al., Metals Handbook Ninth Edition, vol. 16, Machining, 1989, p. 311.
Milling Cutters and End Mills, The American Society of Mechanical Engineers, An American National Standard, ASME B94. 19-1997, Revision of ANSI/ASME B94. 19-1985, pp. 2-4.
Fundamentals of Tool Design, Fourth Edition, revised by Dr. John G. Nee, CMfgE, Society of Manufacturing Engineers, 1998, p. 103.
Oberg et al., 26th Edition Machinery's Handbook, A Reference Book for the Mechanical Engineer, Designer, Manufacturing Engineer, Draftsman, Toolmaker, and Machinist, Industrial Press Inc., New York, 2000, pp. 723-724.
"Reference Book for a Tool Man", Editor I.A. Ordinartsev, Leningrad "Machinostroenie" Publishing House Leningrad Branch, 1987, p. 342. (English translation).
U.S. Appl. No. 13/625,960, filed Sep. 25, 2012, (49 pages).
U.S. Appl. No. 13/773,743, filed Feb. 22, 2013, (82 pages).
U.S. Appl. No. 13/626,185, filed Sep. 25, 2012, (53 pages).
Sandvik Coromant, Modern Metal Cutting.

* cited by examiner

DOUBLE-SIDED CUTTING INSERT FOR DRILLING TOOL

FIELD OF THE INVENTION

The present invention relates to the field of cutting tools. In particular, the present invention relates to a double-sided cutting insert for a drilling tool.

BACKGROUND OF THE INVENTION

Cutting inserts typically suffer from a limited service life in peripheral rotary milling applications. Peripheral milling (also called "slab milling") creates a milled surface by using cutting inserts which are located on the periphery of the milling tool. Milling is usually accomplished by rotating the milling tool about a rotation axis parallel to the milled surface of the workpiece. Indexable cutting inserts comprising a positive rake face geometry on both the axial cutting face and the radial cutting face of the insert are commonly employed in operations involving the use of a peripheral rotary tool. An indexable cutting insert includes multiple cutting edges. When a cutting edge that is in use is worn or damaged, an indexable insert can be rotated to assume a different orientation in the insert pocket of a tool holder so that a different cutting edge of the insert is presented to the workpiece. The positive cutting geometry of the inserts reduces the necessary cutting forces and consequently reduces power consumption, resulting in a more efficient cutting operation. Certain cutting inserts used in peripheral rotary milling operations are generally parallelogram-shaped (i.e., each has a generally parallelogram-shaped profile when viewed from a point above the top surface of the insert), with two long sides forming two main cutting edges and two short sides forming two minor cutting edges. These types of cutting inserts provide the capability of a larger depth of cut, although such inserts are not as strong as, for example, square-shaped cutting inserts.

Double-sided cutting inserts double the number of available cutting edges relative to single-sided inserts, thereby creating even greater benefits in cost reduction for both cutting tool end users and cutting tool manufacturers. Presently, double-sided cutting inserts are most commonly used in stationary machining applications, such as turning or grooving, wherein the cutting tool is stationary and the workpiece being machined is rotating. One of the major challenges in developing useful double-sided cutting inserts for a rotary tool is providing for a positive cutting geometry in a rotary machining application, such as hole drilling.

Previously, double-sided cutting inserts were only suitable for use in stationary machining applications. These applications, as noted above, require rotating the piece being machined while the cutting tool remains stationary. In recent years, due to demand for cost reduction and higher productivity from cutting tool end users, double-sided cutting inserts have been developed for milling applications.

Presently available double-sided cutting inserts use an identical cutting profile and cutting geometry for the top and bottom faces. This identical geometry is maintained in order to support an inscribed circle within the insert. It is extremely difficult, if not impossible, to achieve improved machining performance using the same identical cutting insert for a machining application like drilling operations, wherein the cutting speed of a drilling tool varies from zero at the center to a maximum at the periphery. This discrepancy in cutting speeds results because the cutting edge rotates about an axis of rotation to cut the workpiece. The region of the cutting edge that is further from the rotation axis in a radial direction must sweep through a longer path for every revolution about the axis. Regions of the cutting edge radially closer to the rotational axis, conversely, sweep a shorter distance per revolution. Any portion of a cutting edge at the axis remains in the same position during rotation about the axis and, thus, does not sweep any distance per revolution of the tool. Therefore, the cutting speed (i.e., the distance swept by the cutting edge per time) varies from zero at the axis of rotation to a maximum at the cutting edge region radially furthest from the axis. As cutting speed increases, the cutting power on the cutting edge increases, resulting in greater wear.

Thus, there is a need for an improved double-sided cutting insert that overcomes the drilling performance limitations resulting from variation in cutting speeds along the cutting edge in the radial direction, as well as other disadvantages and shortcomings.

SUMMARY OF THE INVENTION

According to one aspect of the present disclosure, a double-sided cutting insert for a drilling tool is provided that includes a top side, a bottom side, and at least one side surface interconnecting the top side and the bottom side and forming at least one cutting edge of the cutting insert. The top side and the bottom side comprise different external profiles and chip groove geometries and an identical inscribed circle, and each of the top side and the bottom side comprises four indexable cutting edges.

According to yet another aspect of the present disclosure, a drilling tool system is provided that includes at least two double-sided cutting inserts. Each of the at least two cutting inserts includes a top side and a corresponding bottom side interconnected by at least one side surface. The bottom side and the top side of an insert are distinguishable from each other in shape, and each of top side and bottom side of a cutting insert comprises at least four cutting edges which are 90° rotationally symmetrical about a center hole axis of the cutting insert. According to certain embodiments, each of the at least two double-sided cutting inserts is connected to a main shaft and is positioned to permit drilling activities. According to certain embodiments, the main shaft is capable of rotational motion at speeds necessary to commence a drilling activity.

According to an additional aspect of the present disclosure, a double-sided cutting insert is provided including a top side and a bottom side, wherein the top side and the bottom side include different external profiles and an identical inscribed circle. Also, each of the top side and the bottom side of the cutting insert individually comprises at least four identical cutting edges.

Further areas of applicability of the present invention will become apparent from the detailed description provided hereinafter. It should be understood that the detailed description and specific examples, while indicating certain possible embodiment according to the present invention, are intended for purposes of illustration only and are not intended to limit the scope of the invention.

BRIEF DESCRIPTION OF THE DRAWINGS

The present invention will be more fully understood from the detailed description and the accompanying drawings, which are not necessarily to scale, wherein.

DETAILED DESCRIPTION OF THE INVENTION

In the present description of non-limiting embodiments, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description are approximations that may vary depending upon the desired properties one seeks to obtain. At the very least, and not as an attempt to limit the application of the doctrine of equivalents to the scope of the claims, each numerical parameter should at least be construed in light of the number of reported significant digits and by applying ordinary rounding techniques. Therefore, the following detailed description of certain embodiment(s) is merely exemplary in nature and is in no way intended to limit the invention, its application, or its uses.

The double-sided cutting insert of the present invention possesses different external profiles and chip groove geometries within the same inscribed circle for both the top and bottom faces, which also are referred to herein as top and bottom "sides". These differences allow the cutting insert to include twice the number of cutting edges relative to conventional inserts used for the same applications. Both the top and bottom faces or sides, individually, comprise four sets of cutting edges that are indexable by rotating the insert 90 degrees about the center hole axis, resulting in a total of eight indexable cutting edges for each cutting insert. This unique geometry not only doubles the number of cutting edges as compared to existing single-sided cutting inserts, but it also improves performance by applying different cutting geometries to different cutting regions along the radial direction. In addition, because of differences between the external profile and chip groove geometries, it is both easier and more cost-effective to manufacture a composite double-sided cutting insert according to the present invention that has a different carbide grade for the top and bottom sides and the same hard metal coating over the entire cutting insert. Thus, double-sided cutting inserts according to the present disclosure may include one or more cemented carbide materials. Examples of suitable cemented carbide materials include, but are not limited to, composites including particles of transition metal carbides, such as tungsten carbide, embedded in a binder. Suitable binders include, but are not limited to, cobalt, nickel, iron, and alloys of these elements. The metal carbide particles are a discontinuous phase embedded within a continuous phase of the binder. Thus, a cemented carbide material's properties are a combination of the hardness and wear resistance of the extremely hard discontinuous phase, along with the toughness of the relatively soft continuous phase.

Additionally, the present invention also allows for easier identification of the top side from the bottom side, as well as preventing the erroneous positioning of the cutting insert in the insert pocket. The different pocket geometry and size for the top and bottom sides on the same cutting insert aid in the prevention of erroneous positioning. Also, erroneous positioning is avoided through the differences between the top and bottom sides' external profiles and chip groove geometries.

The present invention also addresses a problem associated with drilling operations resulting from the variation in cutting speeds along the cutting edge in the radial direction. The unique geometry of double-sided inserts according to the present invention is advantageous to addressing that problem.

Further advantages may be achieved by the combination and selection of the cutting face geometry and the cemented carbide grade material. For example, non-limiting embodiments of a double-sided cutting insert according to the present invention may be achieved by using a composite structure that has a first side or face composed of a relatively tough cemented carbide grade and a second side or face composed of a more wear resistant cemented carbide grade. Toughness may be defined as the ability of a metal to rapidly distribute within itself both the stress and strain caused by a suddenly applied load (e.g., the ability of a material to withstand shock loading). The first side or face may have a cutting geometry including a uniform and free flowing chip breaker configuration design to suit the best machinability of work materials, thus favoring a lower cutting speed. The second side or face may have a cutting geometry different from the first side or face and that is adapted to a faster cutting speed. The cemented carbide grade of the first side or face may be, for example, any of carbide grades P20 to P40 having transverse rupture strength ranging from 1600 to 1950 N/mm$^2$, grades M20 to M40 having transverse rupture strength ranging from 1900 to 2100 N/mm$^2$, or grades K20 to K40 having transverse rupture strength ranging from 1950 to 2500 N/mm$^2$ (transverse rupture strengths according to Machinery's Handbook (26$^{th}$ ed., Industrial Press, 2000)).

In a drilling tool including multiple indexable cutting inserts, machining performance can be greatly improved by optimizing the combination of cutting geometry, carbide grade, and insert pocket locations on a drilling tool.

For example, during a drilling operation for hole making, the present invention may be adapted to improve drilling performance if a tougher carbide grade is applied to the region of the side or face of the insert that is located close to the drill center. This, for example, increases the shock/impact resistance and also provides better wear resistance.

Additionally, the double-sided insert of the present invention provides a cutting insert manufacturer with a simplified production operation.

Figure 1A:
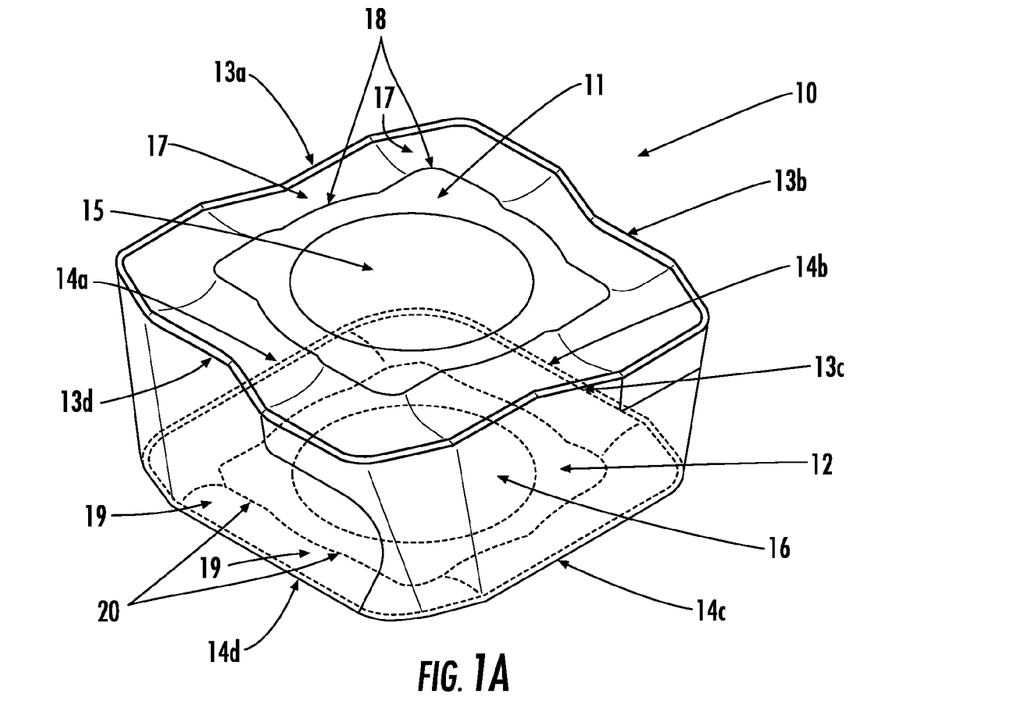
FIG. 1A is a three-dimensional view of an embodiment of a double-sided cutting insert in accordance with the present invention.

Referring now to the figures, FIG. 1A illustrates one non-limiting embodiment of a double-sided cutting insert in accordance with the present invention. A double-sided cutting insert 10 is shown in FIG. 1A. The double-sided cutting insert 10 of FIG. 1A, comprising a top side or face 11 and a bottom side or face 12, has eight cutting edges represented by reference numerals 13a, 13b, 13c, 13d for the top side or face 11, and 14a, 14b, 14c, 14d for the bottom side or face 12. The top side 11 and the bottom side 12 comprise an external profile that is different for each side. The chip groove geometry for the top side 11 and the bottom side 12 also may be different for each side. Additionally, the positioning of the insert pocket locations can optimize the final cutting geometries. The top side 11 of the double-sided cutting insert 10 includes a center hole 15 bored entirely through the double-sided cutting insert 10 (as shown on top side 11), a top peripheral cutting edge 13a, and top chip grooves 17 located between the top peripheral cutting edge 13a and the top edges 18 of the top side 11. A screw may be inserted through center hole 15 of the double-sided cutting insert 10 and into a threaded bore (not shown) on a surface of the cutting insert pocket, thereby retaining the insert in the pocket. The bottom side 12 of the double-sided cutting insert 10 includes a center hole 16 as shown in bottom side 12, a bottom peripheral cutting edge 14d, and bottom chip grooves 19 located between the bottom peripheral cutting edge 14d and the bottom edges 20 of the bottom side 12.

Figure 1B:
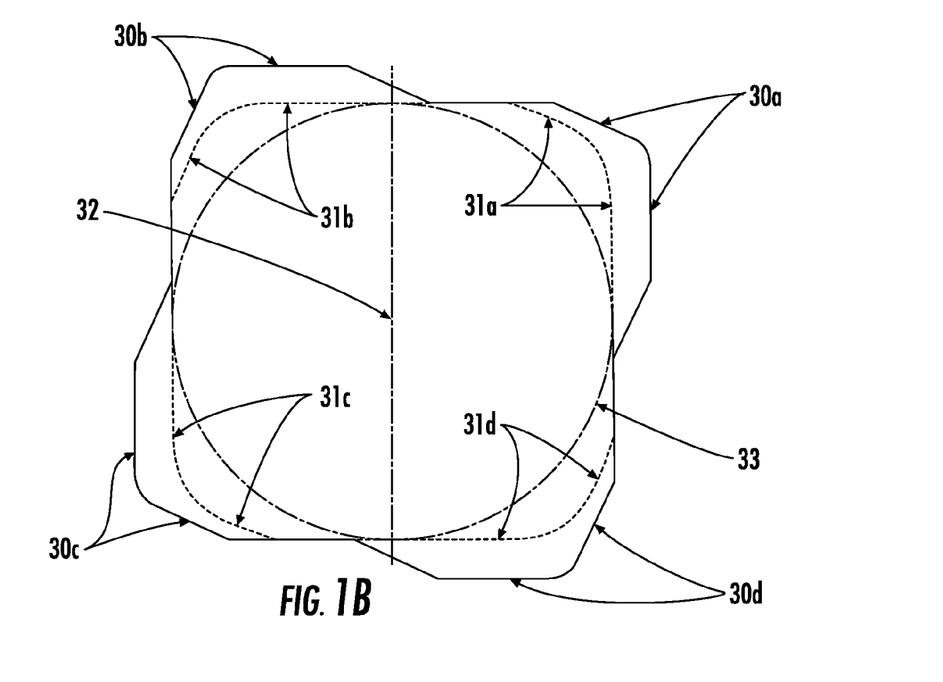
FIG. 1B is a top view of the double-sided cutting insert of FIG. 1A.

In order to illustrate the present invention, the external profiles of both the top side 11 and the bottom side 12 have been extracted from the double-sided cutting insert 10 of FIG. 1A and have been superimposed in FIG. 1B as a top view. The external profile of the top side 11 is indicated as solid lines in FIG. 1B. The top view illustrates the top side 11 comprising four sets of cutting edges 30a, 30b, 30c, and 30d, and is indexable with 90 degrees rotation about the center 32 of the inscribed circle 33. The external profile of the bottom side 12, indicated as long dashed lines in FIG. 1B, comprises four sets of cutting edges 31a, 31b, 31c, and 31d, and is indexable with 90 degrees rotation about the center axis 32 of the same inscribed circle 33. To be clear, while the inscribed circle 33 may be etched onto the top side 11 shown in FIG. 1B, the inscribed circle 33 is an imaginary circle. The inscribed circle is a tool used to define the diameter or radius of the top or bottom face of a cutting insert and is a conventional way of characterizing the size of the insert. In this illustration of a double-sided cutting insert in accordance with the present invention, there are eight sets of usable cutting edges per double-sided cutting insert 10, represented by numerals 30a-d and 31a-d. Top side 11 and bottom side 12 are defined by the same inscribed circle 33. The number of cutting edges and chip grooves may vary in a given double-sided insert, yet are still within the scope of the present invention.

Figure 2A:
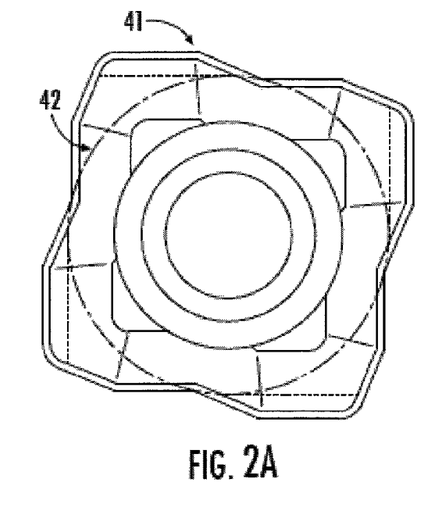
FIG. 2A is a top view of an embodiment of a double-sided cutting insert in accordance with the present invention.
Figure 2B:
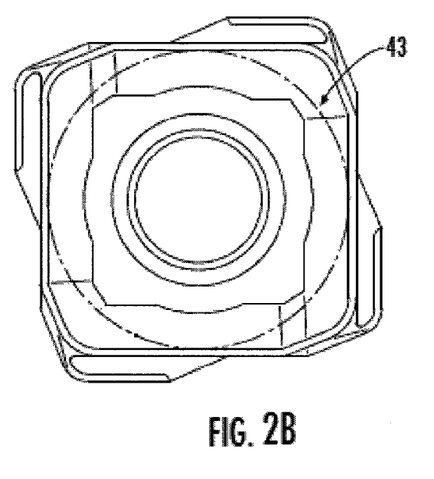
FIG. 2B is a bottom view of a double-sided cutting insert in accordance with the present invention.
Figure 2C:
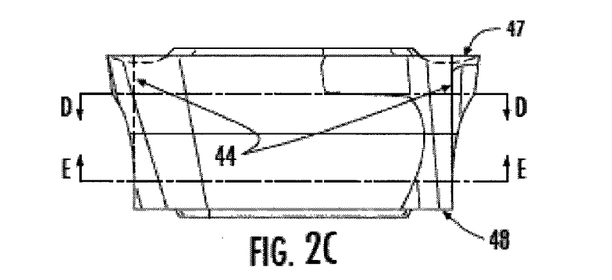
FIG. 2C is a side view of the double-sided cutting insert shown in FIGS. 2A and 2B.
Figure 2D:
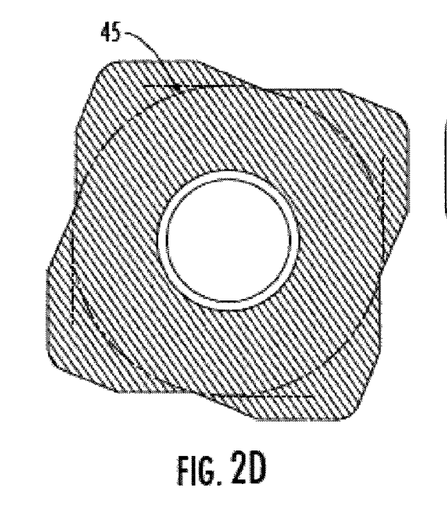
FIG. 2D is a sectioned view of the double-sided cutting insert shown in FIGS. 2A, 2B and 2C, sectioned along and viewed in the direction of the arrows of line D-D in FIG. 2C.
Figure 2E:
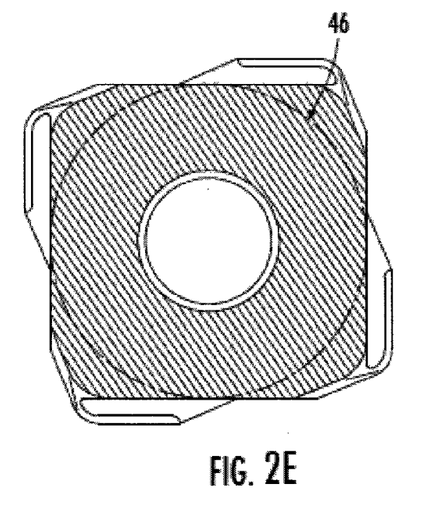
FIG. 2E is a sectioned view of the double-sided cutting insert shown in FIGS. 2A, 2B and 2C, sectioned along and viewed in the direction of the arrows of line E-E in FIG. 2C.

FIGS. 2A, 2B, 2C, 2D, and 2E further illustrate a double-sided cutting insert 41 in accordance with the present invention having an inscribed circle 42, 43, 45, 46. FIG. 2A is a top view, FIG. 2B is a bottom view, and FIG. 2C is a side view of the cutting insert 41. The inscribed circle 42 shown in FIG. 2A is the largest circle that can be fully inscribed into the external profile of the top side of the double-sided cutting insert 41 and has the same diameter or radius of the circle in inches or SI units as the inscribed circle 43 shown in FIG. 2B, which is the largest circle that can be inscribed into the external profile of the bottom side of the double-sided cutting insert 41. As seen in FIG. 2C, two parallel lines 44 representing the inscribed circle extend all the way from the top side 47 to the bottom side 48 of the double-sided cutting insert 41. Furthermore, two sectioned views taken from D-D and E-E in FIG. 2C are shown in FIG. 2D and FIG. 2E, respectively, where both the inscribed circles 45 and 46 have the same diameter as inscribed circles 42 and 43 in FIG. 2A, FIG. 2B, and FIG. 2C.

Figures 3A, 3B, 3C, 3D, 3E:
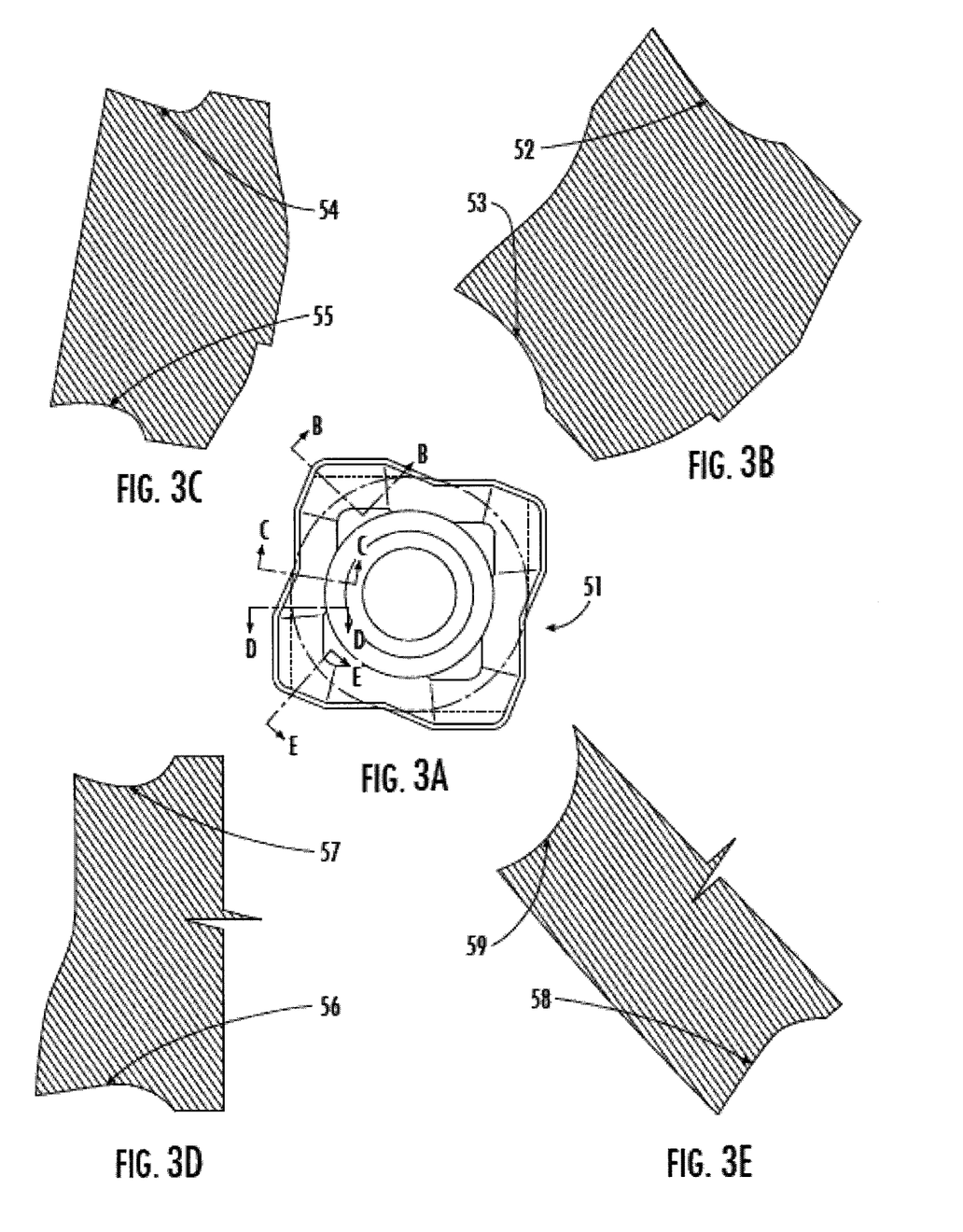
FIG. 3A is a top view of an embodiment of a double-sided cutting insert in accordance with the present invention.
FIG. 3B is a sectioned view of the double-sided cutting insert shown in FIG. 3A, sectioned along and viewed in the direction of the arrows of line B-B in FIG. 3A, showing the chip groove geometry on the top and bottom sides.
FIG. 3C is a sectioned view of the double-sided cutting insert shown in FIG. 3A, sectioned along and viewed in the direction of the arrows of line C-C in FIG. 3A, showing the chip groove geometry on the top and bottom sides.
FIG. 3D is a sectioned view of the double-sided cutting insert shown in FIG. 3A, sectioned along and viewed in the direction of the arrows of line D-D in FIG. 3A, showing the chip groove geometry on the top and bottom sides.
FIG. 3E is a sectioned view of the double-sided cutting insert shown in FIG. 3A, sectioned along and viewed in the direction of the arrows of line E-E in FIG. 3A, showing the chip groove geometry on the top and bottom sides.

FIGS. 3A, 3B, 3C, 3D, and 3E illustrate differences between the chip groove geometry on the top and bottom sides of the double-sided cutting insert 51. Four sectioned views, B-B in FIG. 3B, C-C in FIG. 3C, D-D in FIG. 3D and E-E in FIG. 3E, illustrate the chip groove profile of the double-sided cutting insert 51 in FIG. 3A. As shown in FIGS. 3B, 3C, 3D, and 3E, the chip groove geometries 52, 53, 54, 55, 56, 57, 58, 59 differ in terms of groove profile and groove width (in millimeters as shown) from section to section.

Figures 4A, 4B, 4C:
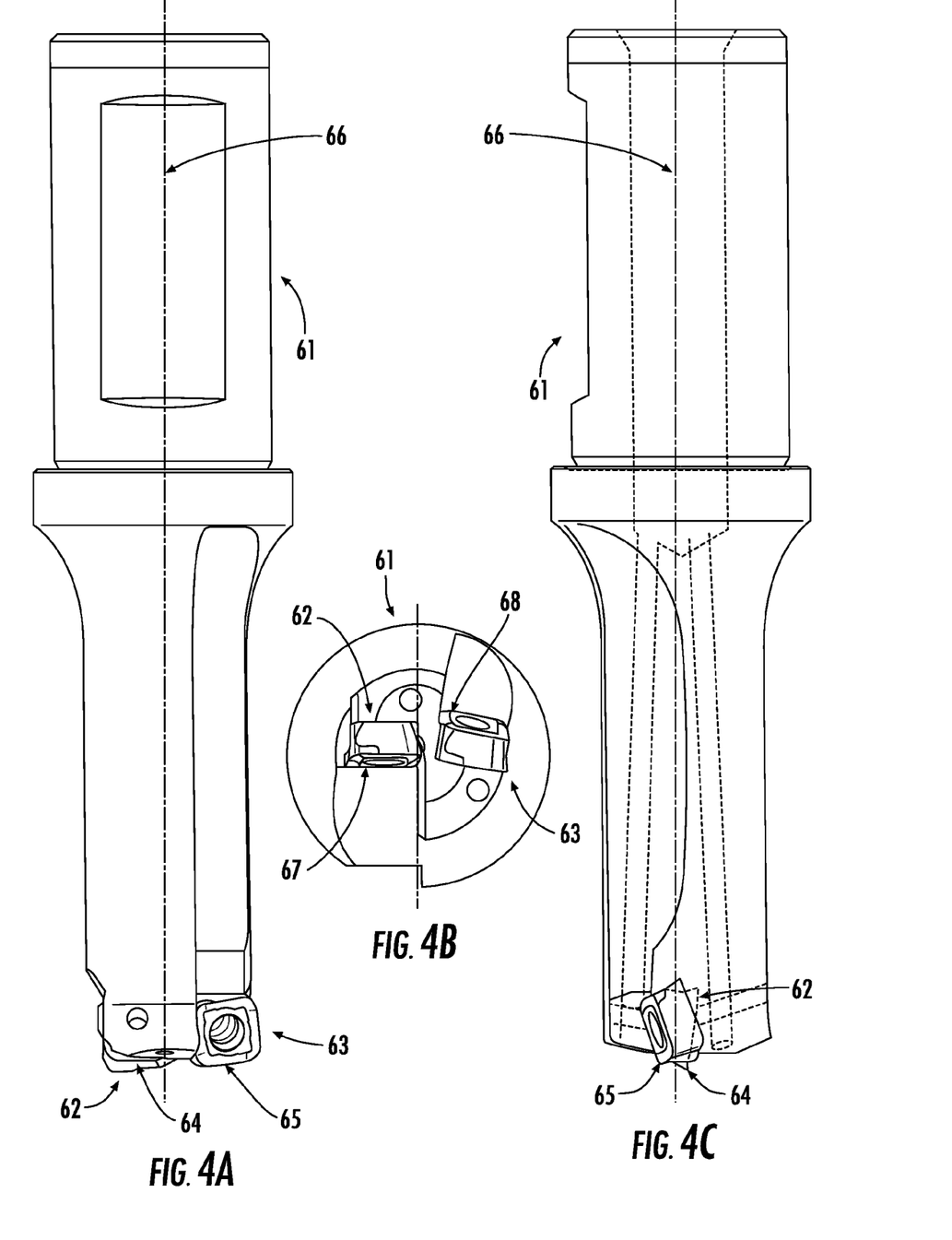
FIG. 4A is a front elevational view of a drilling tool system, comprising a tool holder having two identical double-sided cutting inserts in accordance with the present invention.
FIG. 4B is an end view of the working end of the drilling tool system of FIG. 4A, comprising a tool holder having two identical double-sided cutting inserts in accordance with the present invention.
FIG. 4C is a side elevational view of the drilling tool system shown in FIGS. 4A and 4B, comprising a tool holder having two identical double-sided cutting inserts in accordance with the present invention.

FIGS. 4A, 4B, and 4C schematically depict a drilling tool system comprising a tool holder 61 comprising two identical double-sided cutting inserts 62 and 63, wherein each tool insert is constructed in accordance with the present invention. FIG. 4A is a front view of a drilling tool system comprising a tool holder including two identical double-sided cutting inserts in accordance with the present invention. FIG. 4B is an end view of the working end of a drilling tool system comprising a tool holder including two identical double-sided cutting inserts in accordance with the present invention. As seen in FIG. 4A, the cutting insert 62 is positioned with its cutting edge passing through the center axis 66 of the tool holder 61, and the cutting edge 64 on the top side 67 is an engaging cutting edge. As used herein, an "engaging" cutting edge is the cutting edge that is positioned in the cutting insert pocket to contact or "engage" the workpiece when the tool is used. Because the insert is indexable, the insert could be removed (by removing a retention screw or the like) and then rotated in the insert pocket and re-secured, thereby positioning a new cutting edge so that it will contact the workpiece when the tool is used. The cutting insert 63 positioned at the periphery of the tool holder 61 and the cutting edge 65 on the bottom side 68 is an engaging cutting edge. In drilling operations, the cutting insert 62 is also referred to as the center drill insert and the cutting insert 63 is referred to as the peripheral drill insert.

Figure 5A:
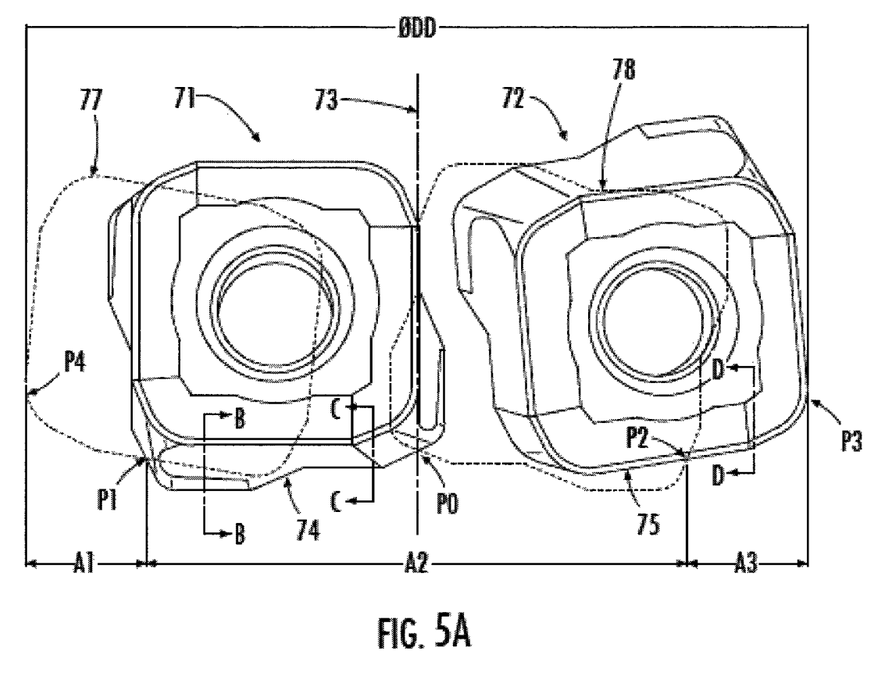
FIG. 5A is a top view of two identical double-sided cutting inserts in a drilling tool system in accordance with the present invention, further illustrating the drilling pattern of the cutting inserts.

FIG. 5A further illustrates the working of two double-sided cutting inserts, 71 and 72, in a drilling tool system. In FIG. 5A, the double-sided cutting inserts 71 and 72 are identical. The two identical cutting inserts 71 and 72 are positioned as illustrated in FIG. 4A, but the tool holder 61 (not shown) is removed in this view. As shown in FIG. 5A, the cutting insert 71 is positioned as a center drill insert, with its top side cutting edge 74 positioned as an engaging cutting edge, and cutting insert 71 rotates about the tool holder center axis 73 during the drilling operation and creates the cutting passage 78 as indicated by dashed lines. The same principle applies to the cutting insert 72, which is positioned as a peripheral drill insert, and which creates the cutting passage 77 by its bottom side cutting edge 75 after rotating about the tool holder center axis 73.

Figures 5B, 5C:
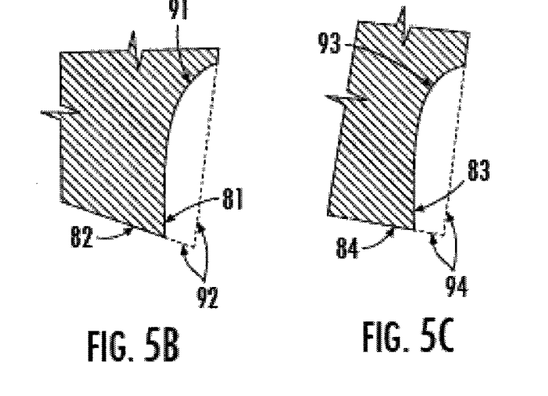
FIG. 5B is a sectioned view B-B of a cutting insert shown in FIG. 5A, illustrating a chip geometry of the insert.
FIG. 5C is a sectioned view C-C of a cutting insert shown in FIG. 5A, illustrating a chip geometry of the insert.
Figure 5D:
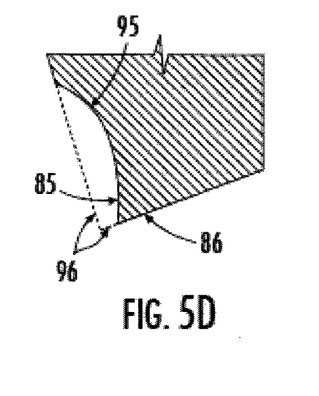
FIG. 5D is a sectioned view D-D of a cutting insert shown in FIG. 5A, illustrating a chip geometry of the insert.

As shown in FIG. 5A, the drilling diameter, indicated as ØDD, which is the diameter of the hole produced, is measured from point P3 to point P4 in FIG. 5A, which are the two outermost points for the diameter. The drill profiles formed by the center drill insert 71 are from point P1 to point P0 and then from point P0 to point P2 as measured by A2 in FIG. 5A. The drill profiles formed by the peripheral drill insert 72 are from point P4 to point P1 and then from point P2 to point P3 as measured by A1 and A3, respectively, in FIG. 5A. Furthermore, three sectioned views, i.e., B-B, C-C and D-D, as shown in FIGS. 5B, 5C, and 5D, demonstrate that different chip groove geometries are applied at different locations along the peripheral cutting edge to generate different positive cutting actions between point P3 and point P4 in FIG. 5A. As can be seen, there are distinct differences among the three sectioned views, which are provided as representative examples.

For example, it is shown in FIGS. 5B, 5C, and 5D, for the three sectioned views, that the cutting edge angle formed by the edges 83 and 84 in section C-C is the largest (83 degrees), the cutting edge angle formed by the edges 85 and 86 in section D-D is the smallest (64 degrees), and the cutting edge angle formed by the edges 81 and 82 in section B-B (74 degrees) is smaller than that of C-C but remains larger than that of D-D. This is primarily because the cutting speed varies from its maximum at the periphery at point P3 (or P4, depending on the insert) to its minimum at the center at point P0 in FIG. 5A, where the drilling tool suffers its biggest impact force during a drilling process. Therefore, at the periphery more positive cutting action with smaller cutting edge angle is provided in order to better adapt to the higher cutting speed; while at the center, a stronger geometry that has been reinforced by a larger cutting edge angle is provided to better withstand the higher impact force encountered during drilling operations.

FIGS. 5B, 5C, and 5D also show that the empty space formed by the chip groove edges 85 and 95 and the dashed lines 96 in section D-D for the peripheral drill insert 72 is smaller than that for the center drill insert 71 as formed by chip groove edges 81 and 91 and the dashed lines 92 in section B-B, and by chip groove edges 83 and 93 and the dashed lines 94 in section C-C. This difference is a result of it being more difficult to evacuate drilling chips produced at the center than at the periphery of the hole during drilling operations. Therefore, a larger empty space above the chip groove is needed for the center drill insert 71 than for the peripheral drill insert 72 in order to effectively evacuate the chips produced and in order to prevent those chips from becoming jammed between the drilling tool holder and the hole being drilled.

Figure 6A:
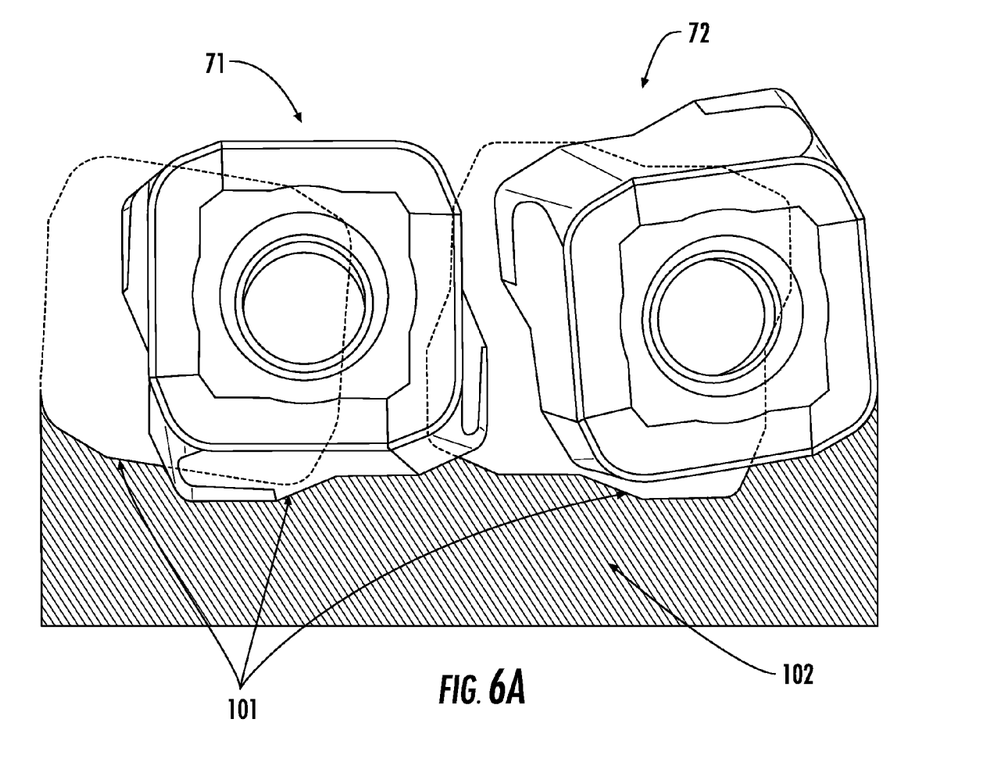
FIG. 6A is a top view of two identical double-sided cutting inserts in a drilling tool system in accordance with the present invention, further illustrating the drilling pattern of the cutting inserts.
Figure 6B:
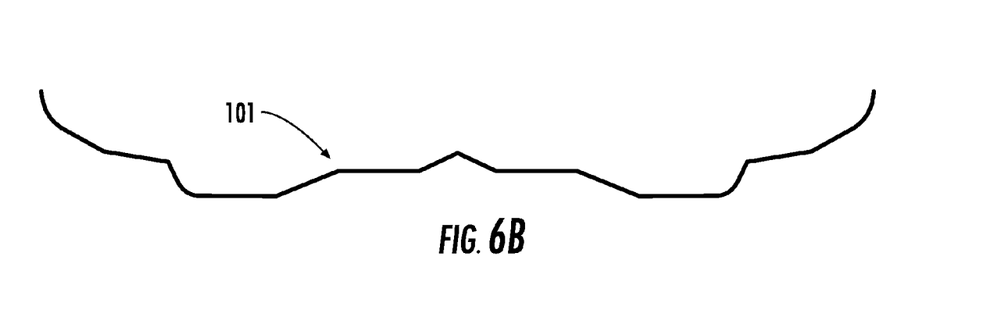
FIG. 6B is an extracted profile of the drilled hole that would be made by the cutting inserts of FIG. 6A in a drilling tool system in accordance with the present invention.

FIGS. 6A and 6B show that the bottom profile of the hole 101 within a workpiece 102 is uniquely formed by the two identical double-sided cutting inserts 71 and 72 shown in FIG. 5A. FIG. 6A demonstrates how the profile is formed. FIG. 6B shows an extracted profile of the hole 101 for clarification purposes. Due to the unique shape of embodiments of the double-sided insert of the present invention (i.e., its rugged and non-tangent profile), drilling with the double-sided insert aids in breaking chips into more numerous and smaller segments.

Figure 7A:
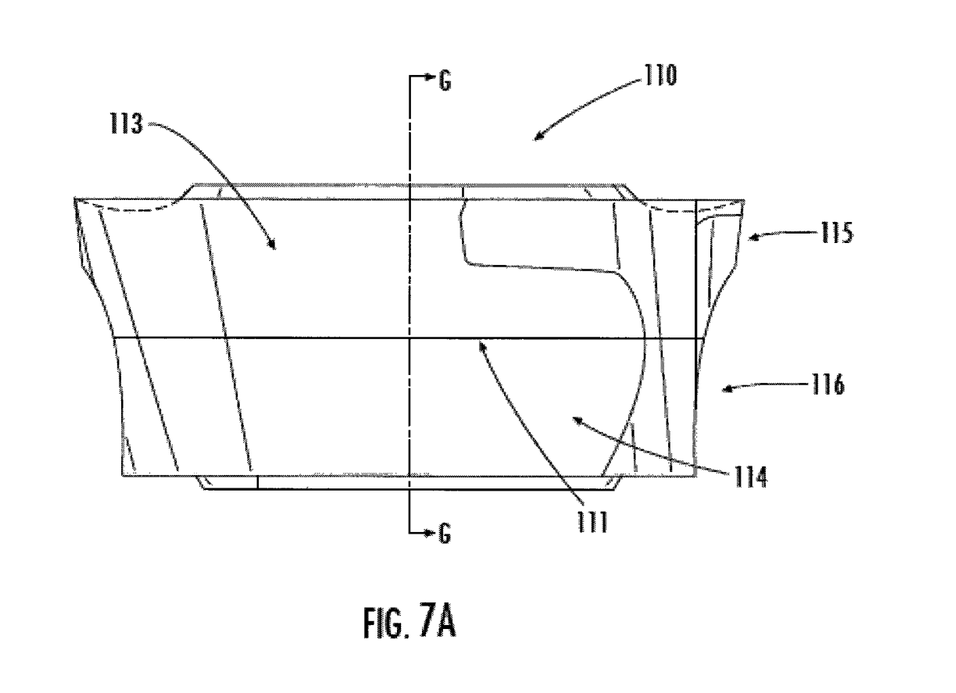
FIG. 7A is a side elevational view of an embodiment of a double-sided cutting insert in accordance with the present invention.
Figure 7B:
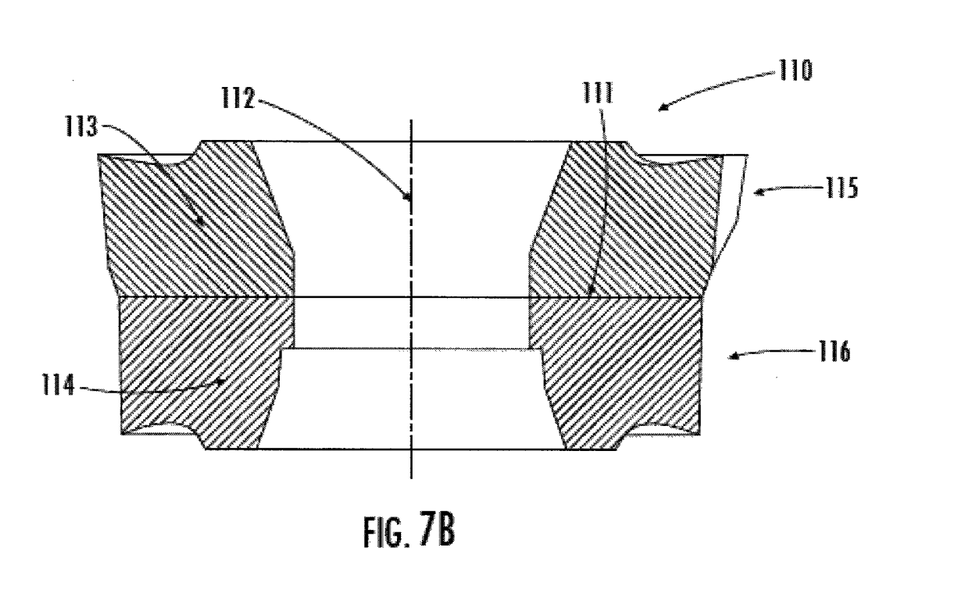
FIG. 7B is a sectioned elevational side view of the double-sided cutting insert shown in FIG. 7A, taken through the rotational axis and viewed in the direction of arrows G-G, and illustrating the composite construction of the insert.

FIGS. 7A and 7B depict a non-limiting embodiment of a double-sided cutting insert 110 in accordance with the present invention constructed as a composite cemented carbide cutting insert. The double-sided cutting insert 110 comprises either two different cemented carbide materials 113 and 114 or the same cemented carbide material but with different cemented carbide grades 113 and 114, being separated by the line 111. Since the top portion 115 of the cutting insert 110 functions as a center drill insert, a cemented carbide material or grade possessing greater impact resistance may be used in that portion. Since the bottom portion 116 of the cutting insert 110 functions as a periphery drill insert, a cemented carbide material or grade having a greater wear resistance may be used in that portion.

FIG. 7A illustrates a side view of a non-limiting embodiment of a double-sided cutting insert in accordance with the present invention, and FIG. 7B shows a sectioned view G-G through the center hole axis 112 illustrating the cutting insert's composite construction comprising two different cemented carbide materials.

Due to the different external profiles between the top side 115 and the bottom side 116 of the composite double-sided cutting insert 110, as shown in FIGS. 7A and 7B, it is easier to identify the top side from the bottom side due to their distinct geometries and shapes. Typical manufacturing processes for making composite double-sided inserts include pressing two different carbide materials in a mold, followed by sintering and grinding the pressed insert, and a subsequent coating step that provides a hard metal coating over the cutting insert. The hard metal coating is an extremely thin (optimally in the range of microns) coating of a metallic alloy that is applied in order to improve wear resistance. There are two common techniques for applying a hard metal coating. One technique is physical vapor deposition (PVD), and another is chemical vapor deposition (CVD). Typical PVD coatings include TiN, TiAlN, TiCN, TiAlN+C, and typical CVD coatings include TiN, TiCN, $Al_2O_3$, TiN—

HfCN-Tin, TiN—TiCN—TiN. The cutting insert shown in FIGS. 7A and 7B provides improved machining performance through an optimized combination of cutting geometry and cemented carbide grade on different sides of the identical double-sided cutting insert.

The double-sided cutting inserts of the present invention preferably comprise eight cutting edges and have different external profiles and chip groove geometries between top and bottom sides. Such inserts may be adapted for hole making applications. These adaptations may be designed with a wide range of geometric features. The double-sided cutting inserts described herein may or may not be of conventional size and are capable of being adapted for conventional use in a variety of drilling applications.

Additionally, including different external profiles and chip groove geometries on top and bottom faces of certain embodiments of double-sided cutting inserts according to the present invention can provide an optimized combination of profile, geometry, and cemented carbide grade for each side, resulting in a considerable improvement in cutting performance. This is a significant improvement over existing double-sided cutting inserts that have an identical top and bottom face.

Embodiments of the double-sided cutting insert provided in this invention also provide significant cost reduction. Significant benefits in terms of improved machining performance can be achieved by a composite construction through the optimized combination of cutting geometry and cemented carbide grade on different faces of the cutting insert to adapt to different cutting actions in hole drilling.

It will be understood that the present description illustrates those aspects of the invention relevant to a clear understanding of the invention. Certain aspects that would be apparent to those of ordinary skill in the art and that, therefore, would not facilitate a better understanding of the invention, have not been presented in order to simplify the present description. Although only a limited number of embodiments of the present invention are necessarily described herein, one of ordinary skill in the art will, upon considering the foregoing description, recognize that many modifications and variations of the invention may be employed. All such variations and modifications of the invention are intended to be covered by the foregoing description and the following claims.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. This disclosure is not intended or to be construed to limit the present invention or otherwise to exclude any such other embodiments, adaptations, variations, modifications and equivalent arrangements.

What is claimed is:

1. A double-sided cutting insert for a drilling tool, the double sided cutting insert comprising:
   a top side;
   a bottom side; and
   at least one side surface interconnecting the top side and the bottom side and forming at least one cutting edge on each side;
   wherein each of the top side and the bottom side comprises a different external profile, a different chip groove profile in cross-section, and an identical inscribed circle; and
   wherein each of the top side and the bottom side comprises four indexable cutting edges.

2. The double-sided cutting insert of claim 1, wherein the external profile and chip groove geometry of the top side and the bottom side fit within a pre-determined shape.

3. The double-sided cutting insert of claim 2, wherein the pre-determined shape is a circle.

4. The double-sided cutting insert of claim 1, wherein on both the top side and the bottom side each of the indexable cutting edges is 90° rotationally symmetrical about a center axis of the cutting insert.

5. The double-sided cutting insert of claim 1, wherein both the top side and the bottom side are based upon a generally square-shaped geometry.

6. The double-sided cutting insert of claim 1, wherein the bottom side is comprised of a cemented carbide.

7. The double-sided cutting insert of claim 1, wherein the top side is comprised of a cemented carbide.

8. The double-sided cutting insert of claim 1, wherein the top side comprises a first cemented carbide, and the bottom side comprises a second and different cemented carbide.

9. The double-sided cutting insert of claim 1, wherein each of the top side and the bottom side comprises a different chip groove width in cross-section.

10. The double-sided cutting insert of claim 1, wherein a portion of the top side external profile overlaps with a portion of the bottom side external profile, and wherein a portion of the top side external profile projects further from the inscribed circle than a portion of the bottom side external profile.

11. A double-sided cutting insert comprising:
    a top side; and
    a bottom side;
    the top side and the bottom side comprising different external profiles, different chip groove profiles in cross-section, and an identical inscribed circle,
    wherein each of the top side and the bottom side individually comprises at least four identical cutting edges.

12. The double-sided cutting insert of claim 11, wherein the bottom side is comprised of a cemented carbide.

13. The double-sided cutting insert of claim 11, wherein the top side is comprised of a cemented carbide.

14. The double-sided cutting insert of claim 11, wherein the top side comprises a first cemented carbide, and the bottom side comprises a second and different cemented carbide.

15. The double-sided cutting insert of claim 11, wherein the top side and the bottom side comprise different chip groove widths in cross-section.

16. The double-sided cutting insert of claim 11, wherein a portion of the top side external profile overlaps with a portion of the bottom side external profile, and wherein a portion of the top side external profile projects further from the inscribed circle than a portion of the bottom side external profile.

17. A double-sided cutting insert comprising:
    a top side; and
    a bottom side;
    the top side and the bottom side comprising different external profiles, different chip groove profiles in cross-section, different chip groove widths in cross-section, and an identical inscribed circle;

wherein each of the top side and the bottom side individually comprises at least four identical cutting edges.

18. The double-sided cutting insert of claim 17, wherein the bottom side is comprised of a cemented carbide.

19. The double-sided cutting insert of claim 17, wherein the top side is comprised of a cemented carbide.

20. The double-sided cutting insert of claim 17, wherein the top side comprises a first cemented carbide, and the bottom side comprises a second and different cemented carbide.

21. The double-sided cutting insert of claim 17, wherein a portion of the top side external profile overlaps with a portion of the bottom side external profile, and wherein a portion of the top side external profile projects further from the inscribed circle than a portion of the bottom side external profile.

* * * * *